B. HOURIOUX.
DRIVING MECHANISM FOR TRACTOR TRICYCLES.
APPLICATION FILED JAN. 10, 1910.
966,445.
Patented Aug. 9, 1910.
4 SHEETS—SHEET 3.
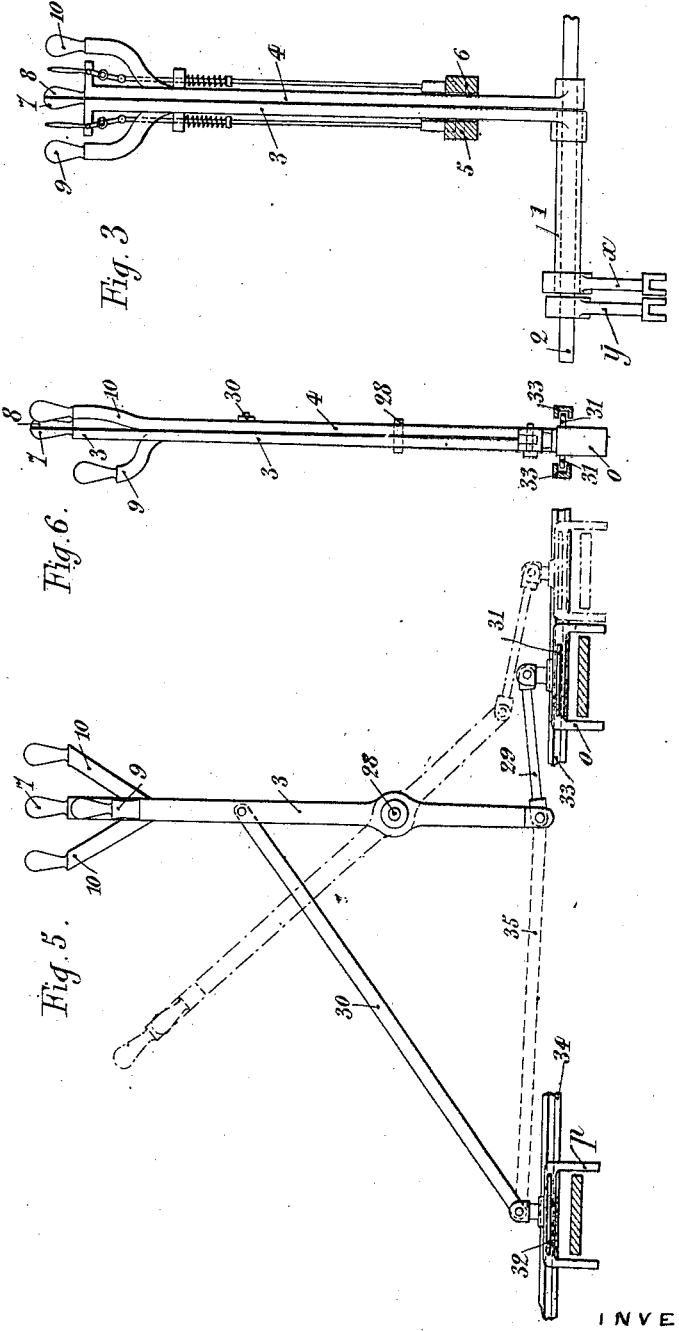
WITNESSES
W. P. Burke
A. F. Heuman
INVENTOR
Benjamin Hourioux
By
ATTY

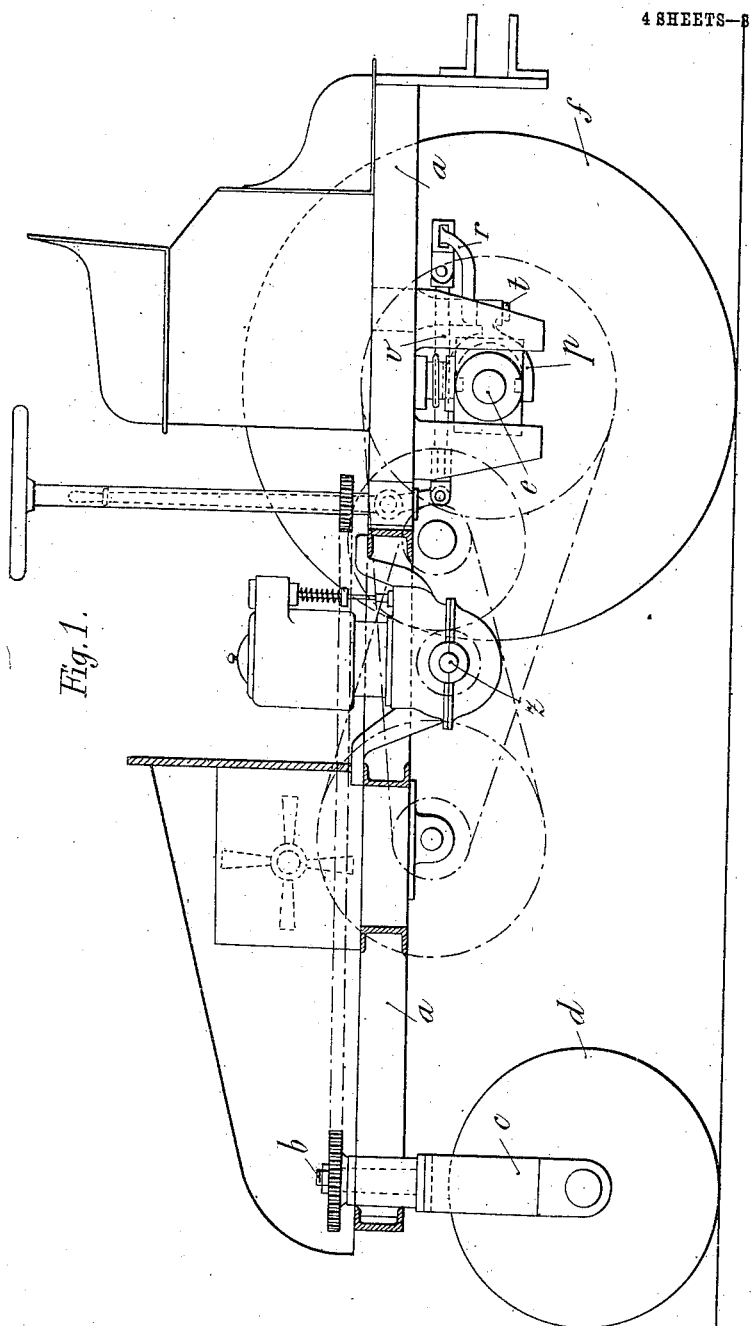

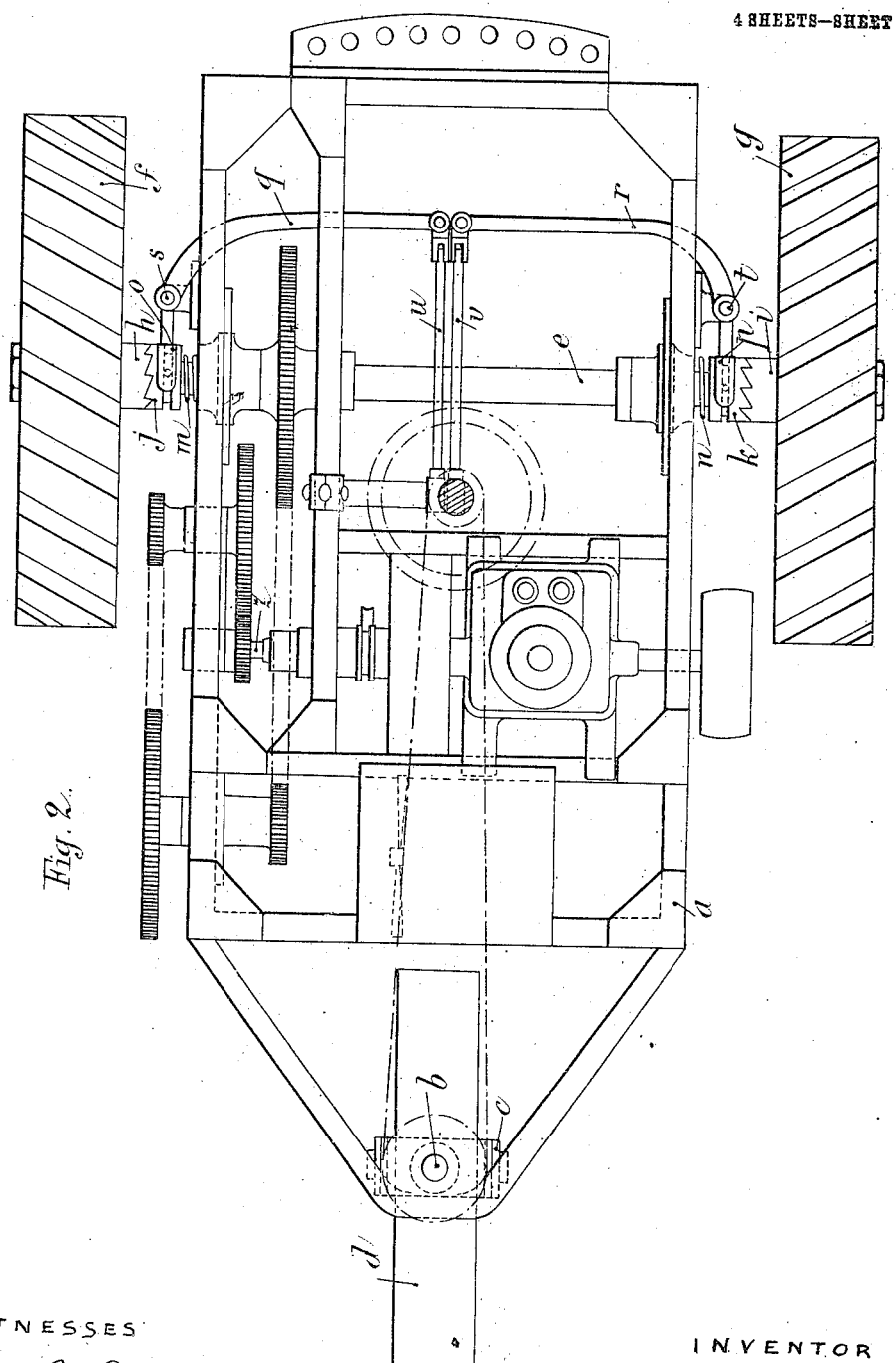

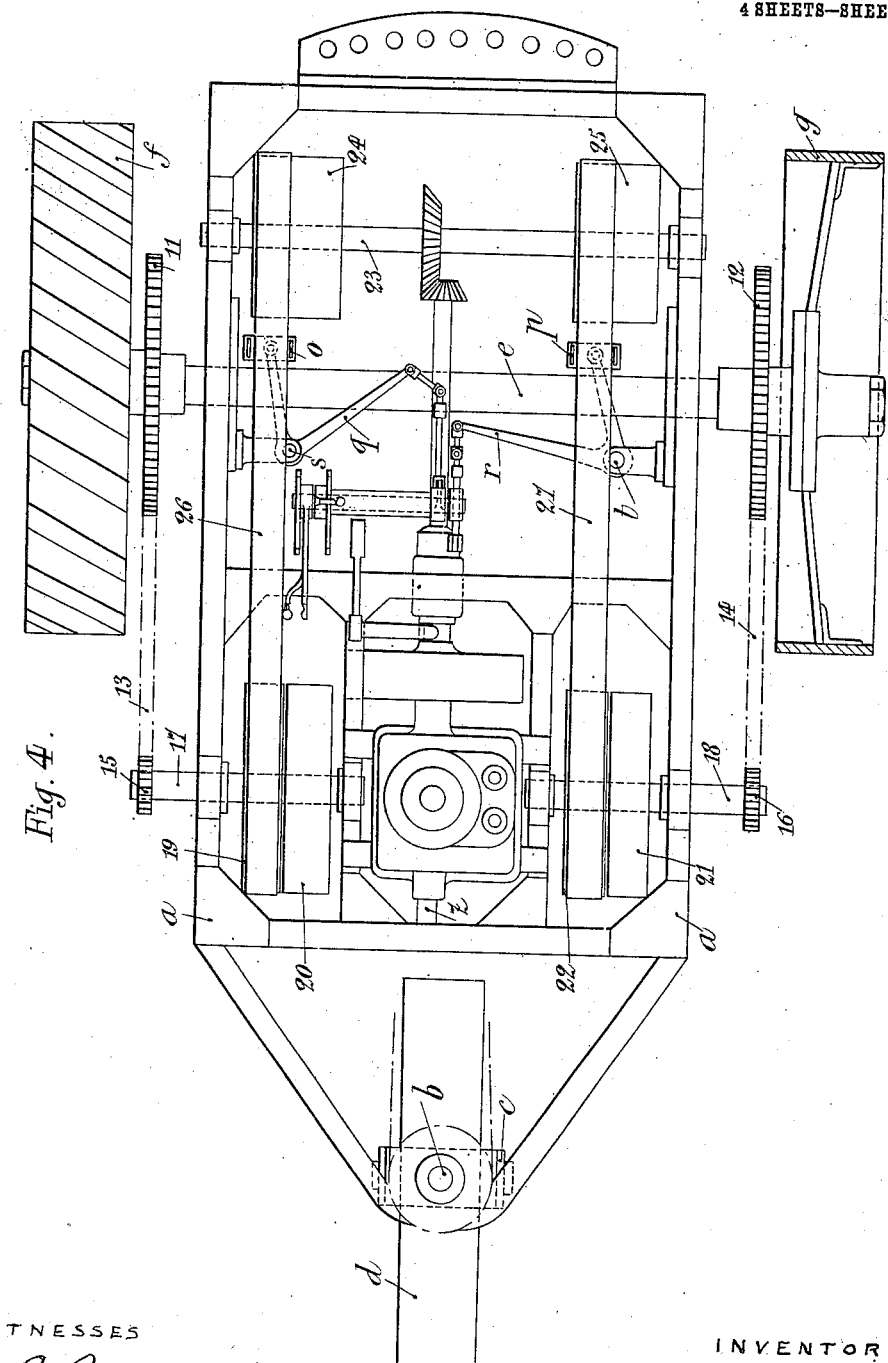

UNITED STATES PATENT OFFICE.

BENJAMIN HOURIOUX, OF RAMBOUILLET, FRANCE.

DRIVING MECHANISM FOR TRACTOR-TRICYCLES.

966,445.  Specification of Letters Patent.  Patented Aug. 9, 1910.

Application filed January 10, 1910. Serial No. 537,290.

*To all whom it may concern:*

Be it known that I, BENJAMIN HOURIOUX, a citizen of the French Republic, and residing at Rambouillet, Seine-et-Oise, France, have invented certain new and useful Improvements in Driving Mechanism for Tractor-Tricycles and the Like, of which the following is a specification.

This invention relates to driving mechanism for tractor tricycles and the like, the tractors being more particularly applicable to the haulage of tilling apparatus and agricultural implements.

The invention consists in a driving mechanism in which one or both of the track wheels may be positively driven or both may run loose.

Two forms of carrying the invention into effect are illustrated by way of example in the accompanying drawings, in which—

Figures 1 and 2 show one form of construction in elevation and plan respectively, Fig. 3 is a partial transverse elevation of the clutching and declutching mechanism, Fig. 4 is a plan of a second form of construction, and Figs. 5 and 6 are partial longitudinal and transverse elevations of a modification of the controlling mechanism for clutching and declutching as applied to the second form of construction.

In the frame $a$ of the vehicle is pivoted the rod $b$ of the supporting fork $c$ of the steering wheel $d$. The frame also carries a horizontal shaft $e$ on the ends of which are mounted the two driving wheels $f$, $g$, provided in the modification shown in Figs. 1, 2 and 3 with the coupling members $h$, $i$ respectively, with which the couplings $j$, $k$ sliding on the shaft $e$ may be brought into engagement. These clutch members are of any known type.

The invention is characterized by the device which allows the members $j$ and $k$ to be operated either simultaneously or separately at will.

As shown in Fig. 2 each of the couplings $j$, $k$ is constantly acted upon by a spring $m$, $n$ tending to keep it engaged with its corresponding coupling members $h$, $i$, which are secured to the wheels $f$, $g$, respectively.

Operatively engaging the sliding coupling members $j$, $k$, are forks $o$, $p$ supported by arms $q$, $r$, respectively, which are pivoted to the frame at the points $s$, $t$. The inner ends of these arms are pivotally connected to the rods $u$, $v$, and the other ends of these rods are jointed to levers $x$, $y$ (Fig. 3) mounted respectively on the two shafts 1 and 2, the shaft 2 being arranged within the shaft 1. Secured to these shafts are operating levers 3, 4, placed side by side and provided with suitable dogs adapted to engage toothed sectors 5, 6. Each of these levers carries at its free end a half-handle 7, 8, and projecting laterally, at the end of an arm, a supplementary handle 9, 10. When the levers 3, 4 are positioned side by side, that is when the two members $j$ and $k$ are coupled with the corresponding elements $h$ and $i$, the half-handles 7 and 8 form a complete handle which the driver may operate for simultaneous actuation of the two levers 3 and 4.

In order to declutch one or the other of the driving wheels separately, the driver operates the corresponding lever 3 or 4 by means of the lateral supplementary handle 9 or 10. Declutching one of the driving wheels, the other remaining in engagement, allows turning to take place about the declutched wheel as a pivot, the steering wheel $d$ being of course suitably directed.

The device of Figs. 1 to 3 is particularly suitable for chain transmissions. It may however, as shown in Figs. 4, 5 and 6 be also applied to a belt transmission. In this modification, the driving wheels $f$, $g$ are loose on the shaft $e$ and their hubs carry toothed wheels 11, 12 respectively connected by chains 13, 14 to the pinions 15, 16 mounted respectively on the shafts 17 and 18, and these shafts carry loose pulleys 20 and 22 and fixed pulleys 19 and 21. The shaft $z$ of the motor drives an intermediate shaft 23 having drum pulleys 24, 25 mounted upon it. Belts 26, 27 connect the latter with the loose or the fixed pulleys of the shafts 17 and 18 according to the position given to the corresponding forks $o$, $p$ carried by bell-crank levers $q$, $r$ pivoted to the frame at points $s$, $t$. The forks $o$, $p$ may be operated as shown in the modification of Figs. 5 and 6, the movement of the levers instead of taking place in a plane parallel to the longitudinal axis of the vehicle taking place in a plane perpendicular to this axis.

The levers 3 and 4 are normally positioned behind one another. The lever 3 carrying the half-handle 7 is further provided in the plane parallel to the longitudinal axis, with an auxiliary handle 9 situated at a lower level than the half-handles so as not to interfere when handling the latter. The rear lever 4 carrying the rear half-handle 8 is provided with two lateral handles 10 in the plane perpendicular to the longitudinal axis. The two levers 3 and 4 may be rotated simultaneously or separately about an axis 28 carried by the frame to operate the forks o and p by means of the rods 29 and 30. The forks o and p may be guided by the ribs 31, 32 movable in U-shaped guides 33, 34 respectively. By reversing the positions of the fast and loose pulleys on the two shafts 17, 18, the rod 30 might be replaced by a rod 35 indicated in chain-dotted lines in Fig. 5 and pivoted to the lower end of the corresponding lever.

Having now described my invention what I claim as new and desire to secure by Letters Patent is:—

1. In a traction vehicle, in combination, a motor, an axle, a track wheel at each end thereof, independent means for operatively connecting each wheel with said motor whereby either wheel may be actuated alone or both wheels may be actuated simultaneously, and levers operatively associated with said means for controlling the actuation thereof, said levers being positioned adjacent one another whereby the operator may simultaneously grasp the same with one hand.

2. In a traction vehicle, in combination, a motor, an axle, a track wheel at each end thereof, independent means for operatively connecting each wheel with said motor whereby either wheel may be actuated alone or both wheels may be actuated simultaneously, and levers operatively associated with said means for controlling the actuation thereof, each of said levers being provided with gripping means, the gripping means of one of said levers being in juxtaposition to the gripping means of the other of said levers when said levers are in their normal positions whereby the operator may simultaneously grasp the gripping means of both levers with one hand.

3. In a traction vehicle, in combination, a motor, an axle, a track wheel at each end thereof, independent means for operatively connecting each wheel with said motor whereby either wheel may be actuated alone or both wheels may be actuated simultaneously, and levers operatively associated with said means for controlling the actuation thereof, each of said levers being provided with a handle, whereby either one of said levers may be actuated by the operator, each of said levers being further provided with a half handle registering with one another to form a complete handle when said levers are in their normal position, whereby the operator may simultaneously grasp said half handles with one hand to actuate said levers.

In testimony whereof I have signed my name to this specification in the presence of two subscribing witnesses.

BENJAMIN HOURIOUX.

Witnesses:
 HENRI MONIN,
 H. C. COXE.